United States Patent [19]

Rouse et al.

[11] Patent Number: 4,561,467
[45] Date of Patent: Dec. 31, 1985

[54] TRIPLE GATE VALVE ASSEMBLY

[75] Inventors: Michael W. Rouse, West Linn; Robert L. Thelen, Woodburn, both of Oreg.

[73] Assignee: Waste Recovery, Inc., Dallas, Tex.

[21] Appl. No.: 665,171

[22] Filed: Oct. 26, 1984

[51] Int. Cl.⁴ .................... F17D 3/00; G01F 11/28
[52] U.S. Cl. .................... 137/624.18; 137/614.14; 137/627.5; 137/624.13; 222/445; 222/504; 251/279
[58] Field of Search ............ 137/630.16, 630.17, 137/624.13, 624.18, 614.13, 614.14, 614.11, 627.5; 222/445, 446, 450, 504; 251/279

[56] References Cited

U.S. PATENT DOCUMENTS

| | | | |
|---|---|---|---|
| 102,745 | 5/1870 | Young | 137/614.13 |
| 1,814,222 | 7/1931 | Morehouse | 137/614.13 |
| 2,626,066 | 1/1953 | Rasmussen | 222/445 |
| 2,694,497 | 11/1954 | Stock | 137/624.18 |
| 3,556,358 | 1/1971 | Armstrong | 222/504 |
| 3,813,015 | 5/1974 | Armstrong | 222/445 |
| 3,833,137 | 9/1974 | Mathews | 222/276 |
| 3,940,981 | 3/1976 | Covey et al. | 137/624.18 |

FOREIGN PATENT DOCUMENTS 38075  3/1979  Japan ..................... 414/267

Primary Examiner—A. Michael Chambers
Attorney, Agent, or Firm—Chernoff, Vilhauer, McClung, Birdwell & Stenzel

[57] ABSTRACT

A valve assembly including three separate gate valves aligned serially with one another and a mechanical linkage for operating the three separate gates in coordination with one another to permit small pieces of lumpy or granular and particulate solid materials to flow under influence of gravity through the three valves from a low pressure zone into a high pressure zone, without reverse flow of material from the high pressure zone to the low pressure zone. Each gate is biased to a closed condition and provides a substantially airtight seal when it is closed to prevent reverse flow from the high pressure zone to the low pressure zone. A mechanical linkage opens the first and last gates simultaneously and alternatingly opens the middle gate when the first and last gates are closed.

8 Claims, 7 Drawing Figures

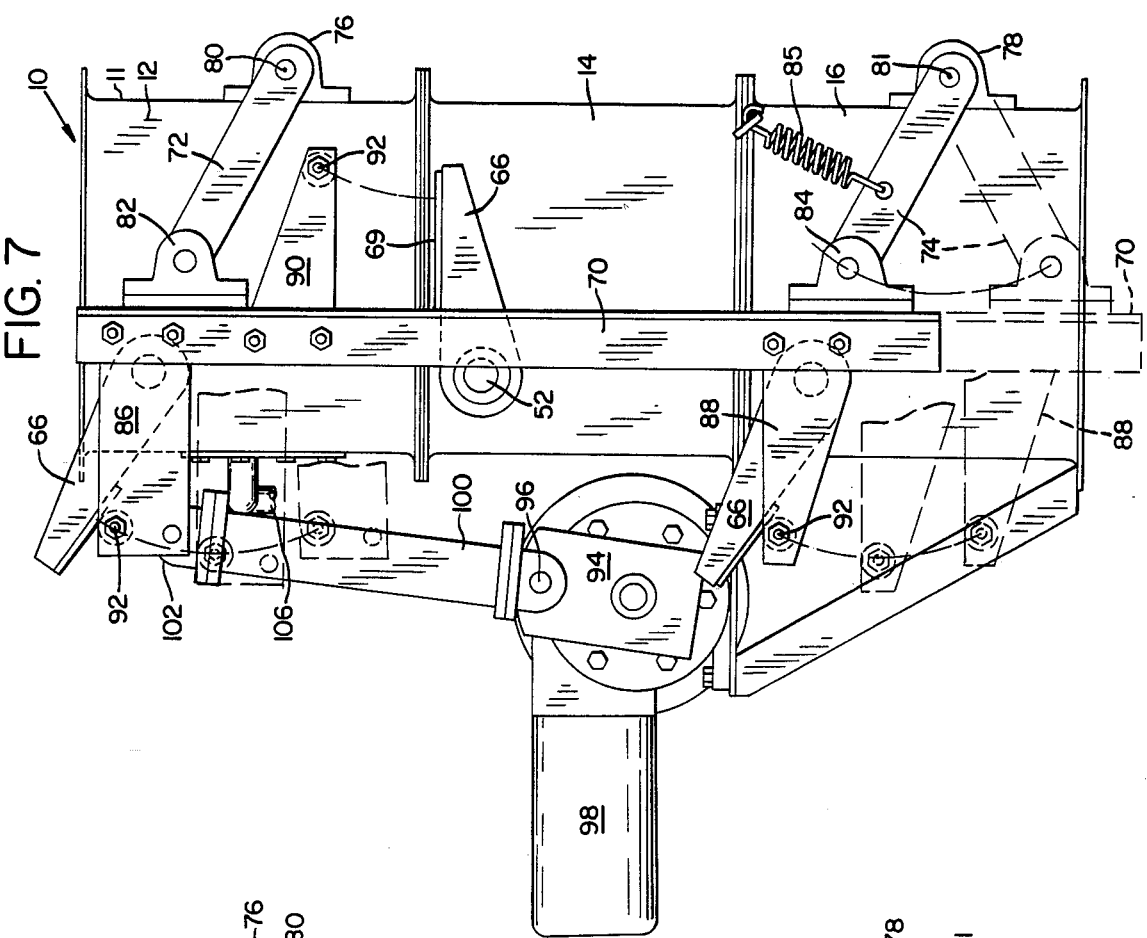
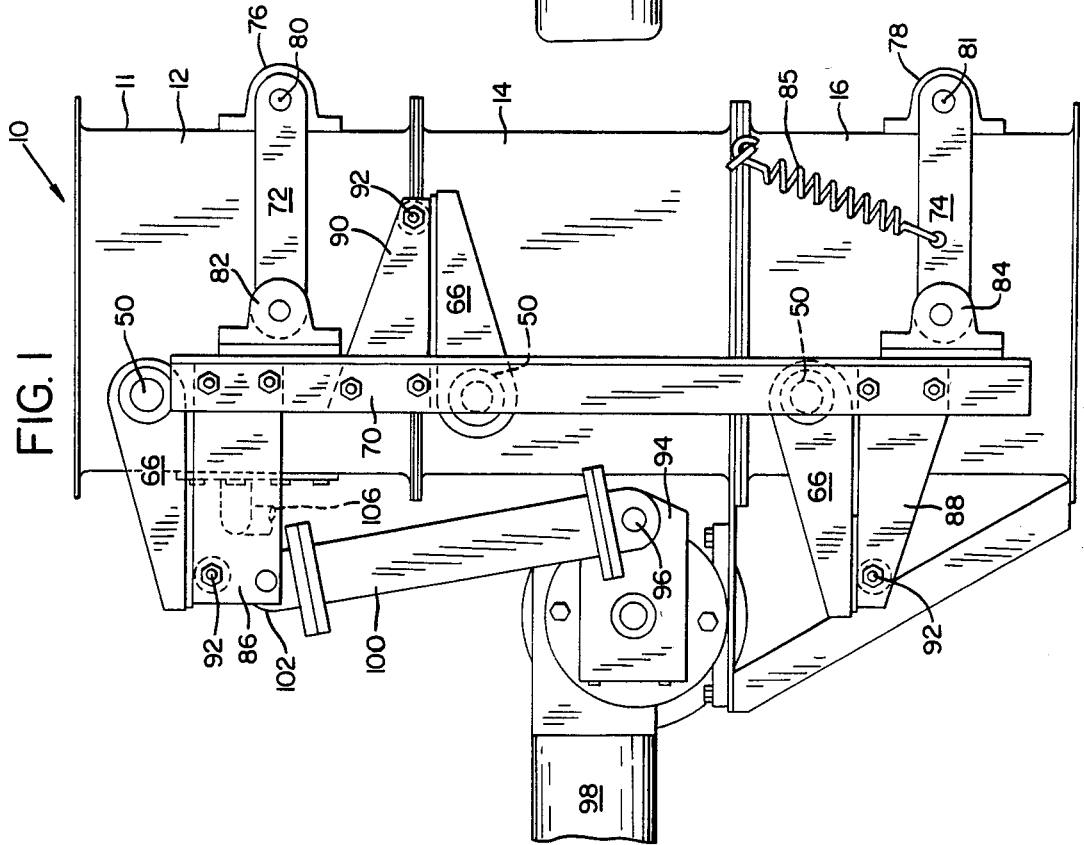

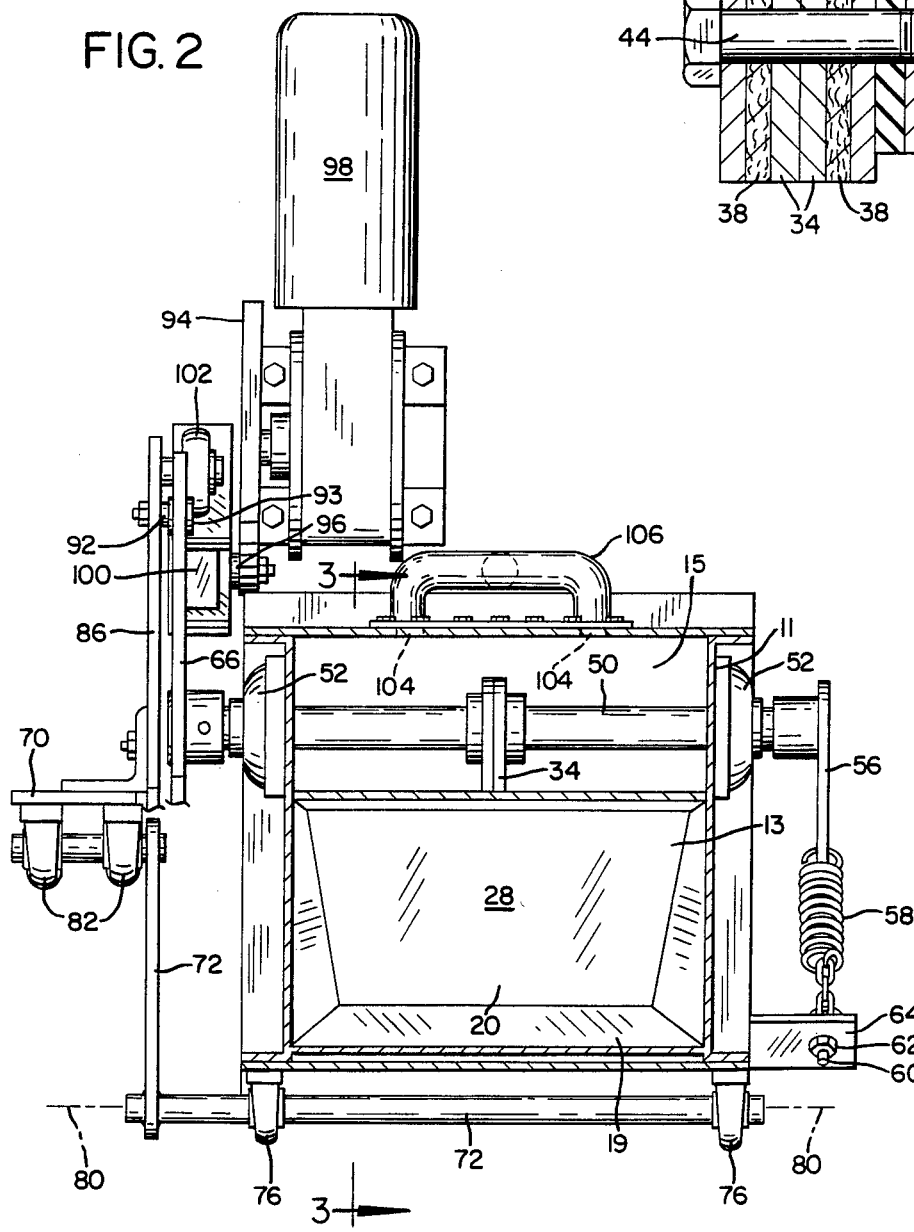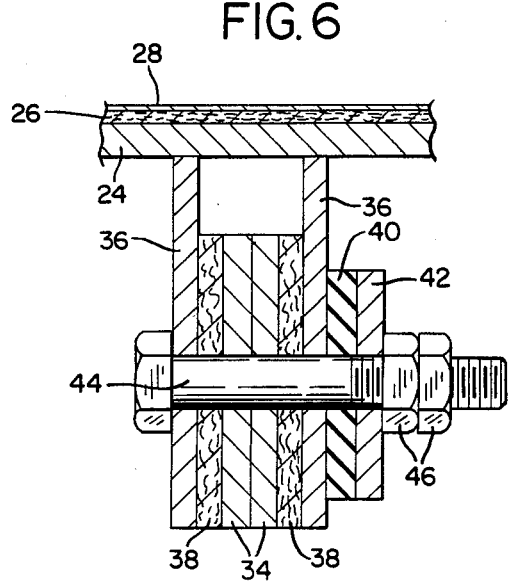

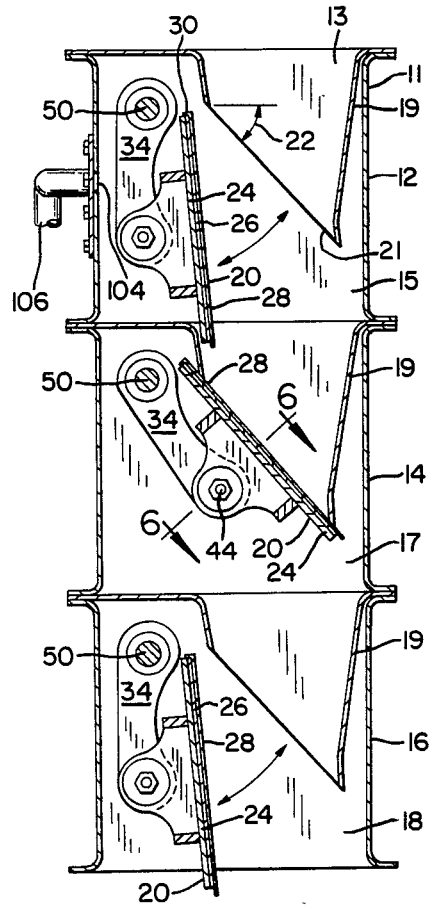
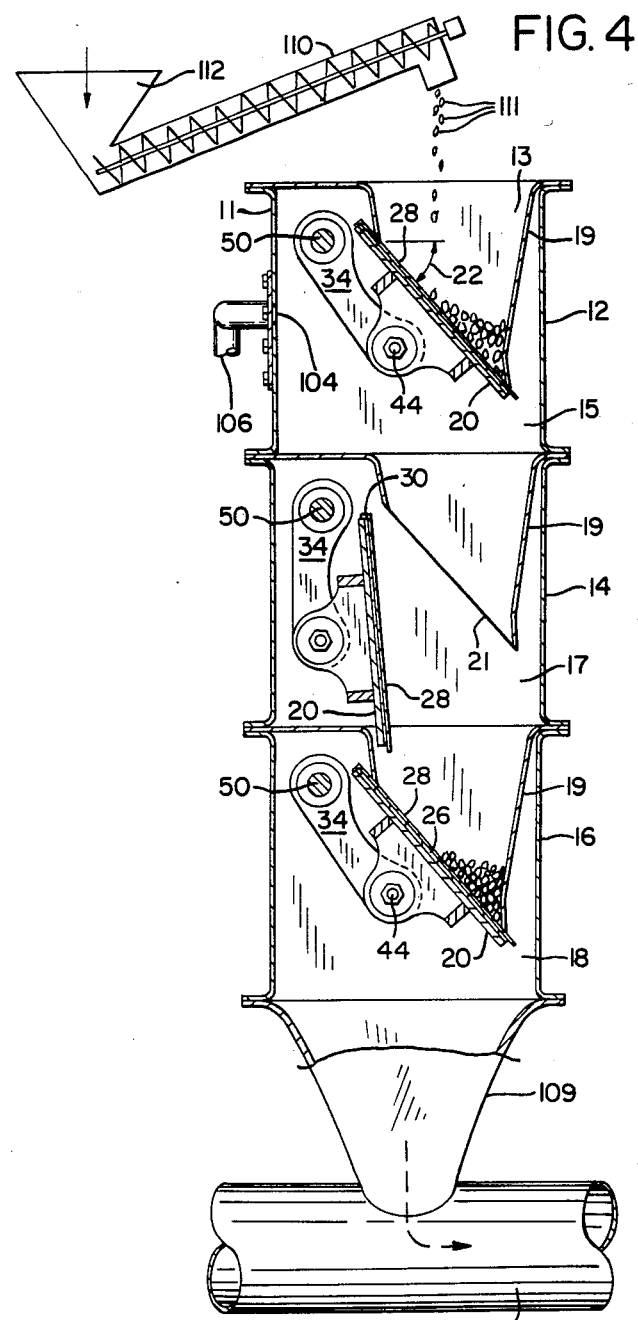
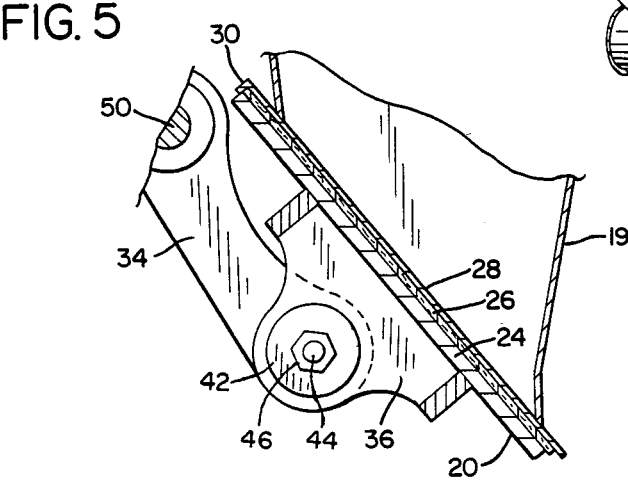
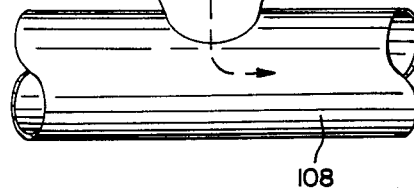

TRIPLE GATE VALVE ASSEMBLY

BACKGROUND OF THE INVENTION

The present invention relates to valves for admitting granular solid materials flowing under the force of gravity into spaces enclosing gas under greater pressure than that in the spaces from which the solid materials are flowing through the valve assembly.

In order to use the heat energy potentially available in some materials which have previously been wasted, it is possible to burn such materials in furnaces depending primarily on the combustion of more conventional fuels, by adding smaller quantities of waste material, usually in comminuted form, to the primary conventional fuel. Thus, it is desirable to add secondary fuels such as comminuted rubber tire waste to the flow of primary fuel and air flowing through a pneumatic fuel feed line into a furnace firebox. Such a mixture, because of the steel wire content of tire waste material, is useful in balancing the chemistry in lime kilns in production of cement. Because of the chemistry involved, it is necessary to add such secondary fuels to the flow of the primary fuel in such a process in controlled amounts.

The primary fuel used in firing a lime kiln, may, for example, be powdered coal carried in a stream of air through a pressurized pneumatic fuel delivery line. When adding secondary fuel to such a line it is necessary to prevent escape of the pressurized flow of fuel and air, since the powdered coal would constitute a hazard to health and present a risk of a dangerous fire. To be most effective a valve assembly for use in such a situation must permit the secondary fuel to flow freely through the valve assembly into the stream of pressurized gas and fuel mixture without escape of the pressurized fuel and air mixture in the direction opposite the flow of the secondary fuel into the pressurized pneumatic fuel delivery line.

A previously available device for the purpose generally of admitting granular or lumpy materials from a low pressure zone into a higher pressure zone has been quite expensive, because of its massive construction and its use of pneumatic cylinder-and-piston assemblies controlled by a timer to operate an upper, non-airtight batch gate, and a pair of lower, airtight sealing gates in a desired sequence.

What is needed, therefore, is an improved and less expensive valve assembly for use in introducing lumpy or granular materials into zones of higher pressure without reverse flow of material through the valve assembly from the higher pressure zone.

SUMMARY OF THE INVENTION

The present invention provides an improved triple gate valve assembly and a mechanical linkage for operating each of the gates of the valve assembly at the proper times relative to the other gates of the valve assembly, to provide a flow of material such as granular or lumpy solid fuel through the valve assembly from a lower pressure zone to a higher pressure zone such as a pneumatic fuel feed line, without reverse flow of material from the higher pressure area through the valve assembly.

The valve assembly of the present invention includes a generally rectangular tubular casing extending generally vertically between an upper, inlet end, and a lower, discharge end. Within the casing are three flow-directing funnels. A respective valve gate, mounted on a pivot shaft, corresponds with each of the funnels and is movable between an open position and a position in which the valve gate sealingly closes the respective one of the funnels. A valve closing mechanism is provided to close each valve unless it is forced open by the valve operating linkage provided by the present invention.

The valve-operating linkage of the present invention includes a generally vertically-oriented connector bar carried on a pair of cranks whose axes of rotation are parallel with the pivot shafts carrying the valve gates. A gate opening lever is fastened to each of the pivot shafts for opening the respective valve gate, and a pusher bar is carried on the connector bar in an appropriate location to operate the valve opening lever of each gate at the appropriate time, as the connector bar is moved reciprocatingly. A drive mechanism, including a crank, a connecting rod connecting the crank with the connector bar, and a motor for rotating the crank, is provided to move the connector bar reciprocatingly upward and downward at a rate which is chosen depending on the type and amount of material which must be passed through the valve assembly.

The pusher bars are arranged on the connector bar with the upper and lower pusher bars extending on one side of the connector bar and the middle pusher bar extending on the opposite side of the connector bar. The valve opening levers extend similarly relative to the gate pivot shafts, so that when the connector bar moves in one direction it permits the middle valve to close and then opens both the top and the bottom gates, and while it moves in the opposite direction it first permits the top and bottom gates to close and thereafter opens the middle gate. Each gate is equipped with a mechanism such as a spring connected with a lever which normally urges the valve toward a closed condition, yet can be overcome, as by the pusher arm and valve opening lever combination, to open the gate. Each of the pusher arms is equipped with a pad to cushion the impact between the pusher arm and the gate opening lever during operation of the valve assembly.

Each gate is equipped with a cushioning layer of a resilient material, covered by a layer of sheet metal which is pressed sealingly against a resilient seal extending along the edge of the respective funnel as each gate closes. This provides for a sealing closure in each of the gates of the valve, in order to prevent reverse direction flow of material from a higher pressure area below the valve assembly upward through the valve assembly.

Each gate is mounted on a gate arm which is fixedly attached to the respective pivot shaft. Each gate is fastened to the respective gate arm by a pair of ears fixed to the gate and which straddle the end of the respective gate arm. Frictional-producing material, such as brake lining material, is located between the ears and the respective sides of the gate arm, and pressure is exerted on the outer sides of the ears to maintain a predetermined amount of frictional resistance to pivoting of the gate upon the gate arm. This leaves the gate sufficiently free to align itself with the edge of the respective chute or funnel, but prevents the gate from moving freely with respect to the gate arm.

It is therefore a primary object of the present invention to provide an improved triple gate valve assembly for introducing a flow of small pieces of solid material from a space subject to a relatively low pressure into a space subject to a higher pressure.

It is a further object of the present invention to provide a triple gate valve assembly which is less complex in its construction than previously known valve assemblies for the same purpose.

It is an important feature of the triple gate valve of the present invention that it includes a novel linkage for operating all of the gates of the valve assembly in a coordinated sequential fashion to permit passage of material through the valve assembly in the desired direction while preventing passage of material through the valve in the reverse direction.

It is another important feature of the present invention that each of the valve gate closures is airtight when it is in its closed condition, so that the valve assembly prevents passage of material in a reverse direction.

It is an important advantage of the present invention that it provides a triple gate valve assembly which is significantly less expensive to manufacture than the previously known valve assemblies of this type.

It is a further advantage of the present invention that it provides a triple gate valve assembly whose operation is more dependable than previously known valves assemblies of this type including complex operating linkages.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevational view of a triple gate valve assembly embodying the present invention.

FIG. 2 is a top plan view of the valve assembly shown in FIG. 1.

FIG. 3 is a sectional side elevational view of a portion of the valve assembly shown in FIGS. 1 and 2, taken along line 3—3 of FIG. 2.

FIG. 4 is a view similar to FIG. 3, showing the valve assembly in a different phase of its cycle of operation.

FIG. 5 is a detail view at an enlarged scale of one of the gate and seat combinations included in the valve assembly shown in FIG. 3, particularly showing the sealing portions thereof.

FIG. 6 is a detail view of one of the gates of the valve assembly shown in FIG. 1, showing the manner of attachment of the gate to the arm upon which it is mounted for operation.

FIG. 7 is a view similar to FIG. 1, showing the position of the valve assembly's operating mechanism at a different phase of its cycle of operation.

DETAILED DESCRIPTION OF THE INVENTION

Referring now to the drawings, in FIG. 1, a triple gate valve assembly 10 embodies the present invention and includes a generally rectangular, vertically-oriented tubular casing 11 housing three similar gate valves arranged one above another and connected to be opened by a mechanical linkage in a sequence which permits material such as granular or small pieces of solid materials to flow downward in sequential steps through the triple gate valve assembly 10 from an area exposed, for example, to normal atmospheric pressure, into an area therebelow in which pressure is greater than atmospheric pressure, without escape of material from the higher pressure zone through the triple gate valve assembly 10.

The casing 11 includes an upper valve section 12 defining an entry chamber 13 and part of an upper chamber 15, a middle valve section 14 defining the bottom of the upper chamber 15 and the top of a lower chamber 17, and a lower valve section 16 defining the bottom of the lower chamber 17, and an exit chamber 18. Each of the valve sections of the casing 11 is generally rectangular as seen from above (FIG. 2). Each includes a funnel 19 and a gate 20 which sealingly closes against a seat 21 defined by the bottom end of the funnel 19. Preferably, the bottom end of each funnel 19 is sloped downward from the horizontal as seen in side view in FIGS. 3 and 4, at an angle 22 of about 50 degrees.

As shown in FIGS. 3-6, each gate 20 comprises a plate 24, to which a cushioning layer 26 of a soft, rubber-like material, for example neoprene (having a hardness of about 15 on the Shore A durometer scale), is attached adhesively to the upper surface of the plate 24. Over the layer 26 is an adhesively attached seal sheet 28 of material such as a 14 gauge sheet stainless steel, chosen because of its toughness and lubricity. Preferably, an upper lip 30 of the seal sheet 28 extends perpendicular to the main area of the seal sheet 28 and lies along an upper edge of the plate 24 to exclude particles of materials from entering the space between the seal sheet 28 and the plate 24 when the gate 20 is open.

Each gate 20 is attached to a respective gate arm 34 by a pivotable attachment shown in section view in FIG. 6. A pair of ears 36 are fixedly attached to the bottom of the plate 24, as by welding. The ears 36 are separated from each other by a distance greater than the thickness of the gate arm 34, and a frictional washer of material such as $\frac{1}{8}$-inch-thick brake lining material 38 is located on each side of the respective gate arm 34, between the ears 36. A resiliently compressible but strong washer, for example a washer 40 of $\frac{3}{8}$-inch-thick fabric reinforced rubber conveyor belting material, and a pressure plate 42 of metal, are held outside the pair of ears 36 by a pivot bolt 44 and a pair of nuts 46. The bolt 44 extends through the ears 36, arm 34, brake lining material 38, washer 40, and pressure plate 42, and the nuts 46 are adjusted and jammed to provide and maintain a desired amount of pressure. This provides friction to prevent free rotation of the gate 20 with respect too the gate arm 34, yet permit the gate 20 to rotate upon contact with the seat 21 of the funnel section 19 when the gate 20 is closed to the extent that it will fit tightly against the seat 21.

Each gate arm 34 is carried on a gate pivot shaft 50 supported by bearings 52 fastened to the casing of the respective valve section, 12, 14 or 16, as by the use of bolts 54, with the opposite ends of the gate pivot shaft 50 extending outside the casing. Each gate arm 34 is fixedly attached to the respective gate pivot shaft 50 for rotation therewith.

A gate closing lever 56 is attached to a first end of each gate pivot shaft 50, and a gate closing spring 58 is connected by an adjustable linkage, for example an eye-bolt 60 threaded into a nut 62 fastened securely to the spring 58, with an end of the eye-bolt 60 being attached, for example, to a bracket 64. Tension in the spring can thus be adjusted to hold the gate 20 against the seat 21 with a desired amount of force to prevent opening of the valve prematurely.

On the opposite end of each pivot shaft 50, also outside the casing 11 of the triple gate valve assembly 10, a gate opening lever 66 is fixedly attached. In each of the upper valve 12 and lower valve 16, the gate opening lever 66 is attached to the respective pivot shaft 50 with a bottom surface 68 extending generally horizontally in a direction away from the side of the pivot shaft 50 on which the gate 20 is located, when the respective gate 20 is closed. A top surface 69 of the gate opening lever 66 of the middle valve 14 extends generally horizontally on the side of the gate pivot shaft 50 on which the gate 20 of the middle valve 14 is located, when the middle valve 14 is closed.

A connector bar 70, supported by a pair of parallel cranks 72 and 74, extends vertically. The cranks 72 and 74 are supported in bearings 76 and 78 which define respective axes of rotation 80 and 81 parallel with the gate pivot shafts 50. The bearings 76 are attached to the upper valve 12 of the casing 11 and the bearings 78 are attached to the lower valve 16 portion of the casing 11. Bearings 82 and 84 are mounted on the connector bar 70 and spaced apart from one another a distance equal to the distance between the bearings 76 and 78, so that the cranks 72 and 74 are parallel with one another. A helical extension spring 85 is connected between the crank 74 and a bracket fastened to the lower valve 16 portion of the casing 11, to support a portion of the weight of the cranks 72 and 74, the connector bar 70, and the pusher plate and bars 86, 88 and 90.

A pusher plate 86 extends horizontally leftward, as seen in FIG. 1, from the connector bar 70 slightly lower than the gate opening lever 66 of the upper valve 12, and a pusher bar 88 similarly extends from the connector bar 70 slightly lower than the gate opening lever 66 of the lower valve 16. A pusher bar 90 extends in the opposite direction from the connector bar 70 slightly higher than the gate opening lever 66 of the middle valve 14. A horizontal finger 92, carrying a hardened rotatable roller such as a roller bearing cam follower 93, is attached to each of the pusher plate 86 and pusher bars 88 and 90 and extends laterally to contact the respective surface 68 or 69 of the gate opening lever 66 at appropriate times during operation of the triple valve assembly 10.

A drive crank 94 including an eccentric crank pin 96 is driven by, for example, an electric motor and gear combination 98, fixedly located with respect to the casing 11 and arranged to drive the drive crank 94 at a controllable speed of rotation. A connecting rod 100 extends between the crank pin 96 and a bearing 102 located on the pusher plate 86, below the finger 92. Rotation of the drive crank 94 causes the eccentric crank pin 96 to move the connecting rod 100 and thus the connector bar 70 upwardly and downwardly, in a path determined by the reciprocating rotation of the cranks 72 and 74, through an acute angle about their support bearings 76 and 78, as shown in FIG. 7.

Referring now additionally to FIGS. 1 and 8, a pair of ports 104 are open into the upper valve chamber 15, above the middle valve 14, but below the gate 20 of the upper valve 12. A conduit 106 interconnects the ports 104 with a low pressure zone, such as the intake side of a blower (not shown) providing air to the pneumatic material transport tube 108 into which the triple gate valve assembly 10 is connected by a funnel 109. The tube 108 thus receives material through the triple gate valve assembly 10 from a conveyor 110 delivering material such as fuel chips 111 from a hopper 112, so that the fuel chips 111 can be transported pneumatically into the firebox of a furnace, along with a supply of primary fuel such as coal dust.

Referring now to FIGS. 1, 2, 3, 4, and 7, as the drive crank 94 rotates moving the eccentric crank pin 96 and thus the connecting rod 100, the connector bar 70 moves upwardly, bringing the fingers 92 of the pusher plate 86 and bar 88 to bear on the gate opening levers 66 of the upper valve 12 and lower valve 16 as shown in FIG. 8. This opens the gates 20 of the upper valve 12 and lower valve 16 away from their respective seats in the respective funnel sections 19 of those valves, as shown in FIG. 3.

As the drive crank 94 continues to rotate, the connector bar 70 descends, allowing the upper valve 12 and lower valve 16 to be closed by their respective gate closing springs 58 and levers 56. As the connector bar 70 is moved further downward by continued rotation of the drive crank 94, the pusher bar 90 pushes the gate opening lever 66 of the middle valve 14 downward, rotating the gate pivot shaft 50 of the middle valve 14 clockwise and opening the gate 20 of the middle valve 14 away from its seat 21. Continued rotation of the drive crank 94 again raises the connector bar 70 to the position shown in FIG. 1 in which all of the gates 20 are closed against their respective seats 21 funnel sections 19 by action of the respective gate closing springs 58. While each gate 20 is opened positively by the mechanism described, the use of the springs 58 (or counterweights on lever arms) to close the gates 20 prevents damage should material lodge temporarily between the gate 20 and its seat 21.

This sequence of opening and closing of the gates 20 of the respective valves of the triple gate valve assembly 10 permits material to accumulate in the entry chamber 13 above the gate 20 of the upper valve 12 while the gates 20 of the upper valve 12 and lower valve 16 are closed. When the gates 20 of the upper valve 12 and lower valve 16 open, material can fall down onto the gate 20 of the middle valve 14 from the entry chamber 13 into the upper chamber 15.

As the crank 94 continues to rotate the connector bar 70 moves downward and the gates 20 of the upper valve 12 and the lower valve 16 again close. Thereafter, the gate 20 of the middle valve 14 opens permitting material to fall from the upper chamber 15 into the lower chamber 17. At the same time, additional material is being accumulated in the entry chamber 13. As the crank 94 continues to rotate and move the connector bar 70, the gate 20 of the middle valve 14 is closed by its closing spring 58, in readiness for receiving another amount of material in the upper chamber 15 from the entry chamber 13 upon the next opening of the gate 20 of the upper valve 12. After closure of the middle valve 14, the cycle is completed. As the next cycle commences, the upper valve 12 and lower valve 16 again open simultaneously while the middle valve 14 remains closed and the first material which entered the entry chamber 13 is permitted to fall from the lower chamber 17 through the exit chamber 18, for example falling into the pneumatic tube 108, despite the fact that the interior of the pneumatic tube 108 is under a higher pressure than the atmospheric pressure surrounding the upper valve 12 where material is first fed into the triple gate valve assembly 10.

Despite the opportunity for expansion, the pressure within the middle chamber 15 of triple gate valve assembly 10 will not be reduced completely to the pressure present above the upper valve 12 simply by the sequence of opening of the lower valve 16 and middle valve 14. The over-pressure which may be present in the middle chamber 15 after opening of the middle valve 14 is relieved, therefore, through the port 104 and conduit 106. This prevents material which may have been carried upward from the pneumatic tube 108 from being released into the atmosphere above the triple gate valve assembly 10.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A valve assembly for admitting a flow of small pieces of solid materials under the influence of gravity from a location subject to a first pressure into a space containing a second pressure greater than said first pressure, comprising:

(a) casing means for defining a generally tubular enclosure having an upper inlet end and a lower discharge end;

(b) a selectively openable and sealingly closable top gate defining an entry chamber within said casing means;

(c) a selectively openable and sealingly closable middle gate located below said top gate and defining a second chamber within said casing means below said entry chamber;

(d) a selectively openable and sealingly closable lower gate located below said middle gate, defining a third chamber within said casing means below said second chamber and defining an exit chamber below said third chamber;

(e) a respective pivotably mounted pivot shaft associated with each of said gates, each gate being supported on a gate arm carried on said respective pivot shaft;

(f) respective gate opening lever means fastened to each of said pivot shafts for opening the respective gate associated therewith;

(g) respective gate closing means associated with each said pivot shaft for urging the respective pivot shaft to rotate in a direction moving the respective one of said gates toward a closed position;

(h) a pair of cranks, each having a first end and a second end, each said first end being supported pivotably by a respective crank support bearing located fixedly with respect to said casing and defining parallel axes of rotation of the ones of said cranks;

(i) a connector bar connected pivotably with the second end of each of said cranks at respective locations along said connector bar;

(j) first and second gate opening means carried on said connector bar for acting respectively on said gate opening lever means attached respectively to said pivot shafts of said top gate and said lower gate, to open said top gate and lower gate substantially simultaneously during movement of said connector bar in a first direction;

(k) third gate opening means carried on said connector bar for acting on said gate opening lever means attached to said pivot shaft of said middle gate to open said middle gate during movement of said connector bar in a second direction; and (l) means for periodically reciprocatingly moving said connector bar in said first and second directions.

2. The valve assembly of claim 1 wherein said first and second gate opening means include first and second pusher bars extending in the direction of a first side of said connector bar and wherein said third gate opening means includes a third pusher bar extending in the direction of a second side of said connector bar, said gate opening lever means of said top and lower gates extending in the direction of said first side from the respective pivot shafts associated with said top and lower gates and said gate opening lever means of said middle gate extending in the direction of said second side from the one of said pivot shafts associated with side middle gate.

3. The valve assembly of claim 1 wherein said connector bar extends generally vertically and said first and second directions are upward and downward, respectively.

4. The valve assembly of claim 1 wherein said means for reciprocatingly moving said connector bar includes a motor, a drive crank having an eccentric member driven rotatingly by said motor, and elongate connecting rod means for interconnecting said eccentric member of said drive crank with said connector bar.

5. The valve assembly of claim 1 including a respective tapered chute defined within said casing means and associated respectively with each of said gates, each of said tapered chutes including means for defining a seat against which said gate rests when in its respective closed position.

6. The valve assembly of claim 5, each said seat including resilient gasket means attached to the respective chute for sealingly pressing against the respective gate.

7. The valve assembly of claim 5, each gate including a main plate, a resilient pad sealingly mounted on said main plate, and a harder facing of sheet material sealingly mounted on said resilient pad and located so as to rest sealingly against said seat when said gate is closed.

8. The valve assembly of claim 1, each said gate being attached to the respective gate arm by pivotable means, including friction-producing material located between relatively movable portions of said gate and said gate arm and resilient means for exerting pressure holding said relatively movable portions in contact with said friction-producing material, for holding said gate substantially fixedly positioned with respect to said gate arm, yet leaving said gate able to move with respect to said gate arm sufficiently align itself to close the respective valve tightly.

* * * * *

UNITED STATES PATENT AND TRADEMARK OFFICE
CERTIFICATE OF CORRECTION

PATENT NO. : 4,561,467

DATED : December 31, 1985

INVENTOR(S) : Michael W. Rouse and Robert L. Thelen

It is certified that error appears in the above-identified patent and that said Letters Patent is hereby corrected as shown below:

Col. 4, Line 45    Change "too" to --to--.

Col. 8, Line 22    Change "side" to --said--;

Col. 8, Line 57    Before "align" insert --to--.

Signed and Sealed this

Twelfth Day of August 1986

[SEAL]

Attest:

DONALD J. QUIGG

Attesting Officer

Commissioner of Patents and Trademarks